United States Patent [19]

Asada et al.

[11] 4,344,129
[45] Aug. 10, 1982

[54] DATA PROCESSOR SYSTEM CAPABLE OF PROVIDING BOTH A COMPUTER MODE AND A SEQUENCER MODE OF OPERATION

[75] Inventors: Kazuyoshi Asada, Hitachi; Hajime Yasuda, Katsuta; Kunihiko Ohnuma, Hitachi, all of Japan

[73] Assignee: Hitachi, Ltd., Tokyo, Japan

[21] Appl. No.: 67,119

[22] Filed: Aug. 16, 1979

Related U.S. Application Data

[63] Continuation-in-part of Ser. No. 746,001, Nov. 30, 1976, abandoned.

[30] Foreign Application Priority Data

Dec. 5, 1975 [JP] Japan ............................. 50-144035

[51] Int. Cl.³ .................... G06F 9/30; G06F 15/46
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,409,879 | 11/1968 | Keister | 364/200 |
| 3,440,612 | 4/1969 | Womack | 364/200 |
| 3,559,188 | 1/1971 | Proctor | 364/200 |
| 3,686,639 | 8/1972 | Fletcher et al. | 364/200 |
| 3,701,113 | 10/1972 | Chace et al. | 364/200 |
| 3,753,243 | 8/1973 | Ricketts, Jr. et al. | 364/900 |
| 3,760,374 | 9/1973 | Nabi | 364/200 |
| 3,761,889 | 9/1973 | Hallee et al. | 364/200 |
| 3,767,901 | 10/1973 | Black et al. | 364/200 |
| 3,911,404 | 10/1975 | O'Neill, Jr. | 364/900 |
| 3,969,722 | 7/1976 | Danco et al. | 364/200 |
| 4,078,259 | 3/1978 | Soulsby et al. | 364/900 |
| 4,136,383 | 1/1979 | Takesue | 364/200 |

*Primary Examiner*—Gareth H. Shaw
*Assistant Examiner*—Thomas M. Heckler
*Attorney, Agent, or Firm*—Craig and Antonelli

[57] ABSTRACT

A data processor system is capable of operating in a first mode comprising a computer mode so as to carry out data processing functions and is also capable of operating in a second mode comprising a sequencer mode so as to carry out high speed sequence operations on the basis of programmed sequences. A high speed change between the computer and sequencer modes can freely be effected by executing mode change instructions so that the data processor system performs the duplex functions of a computer and a sequencer.

6 Claims, 10 Drawing Figures

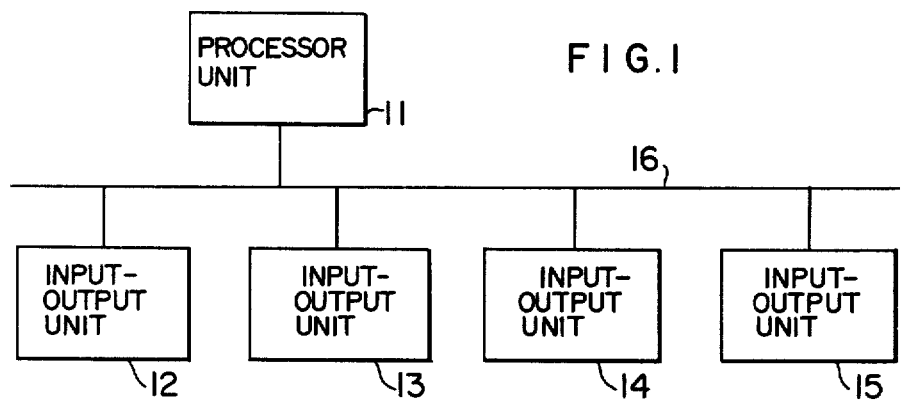
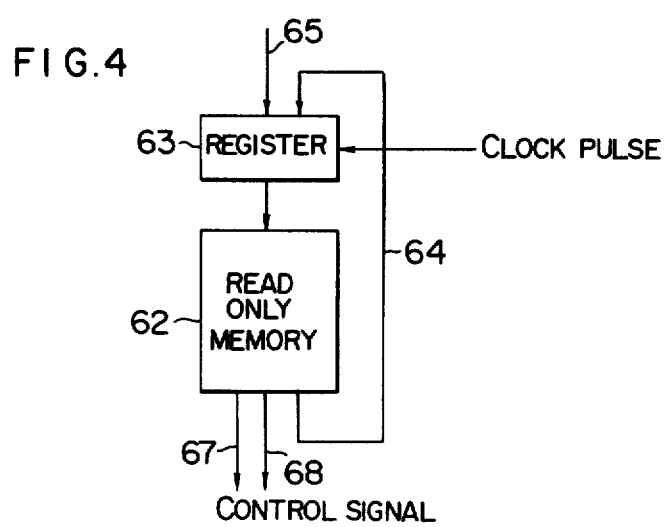
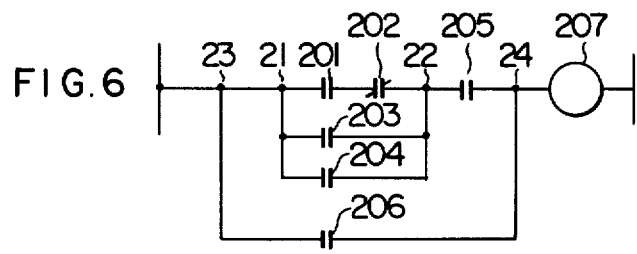

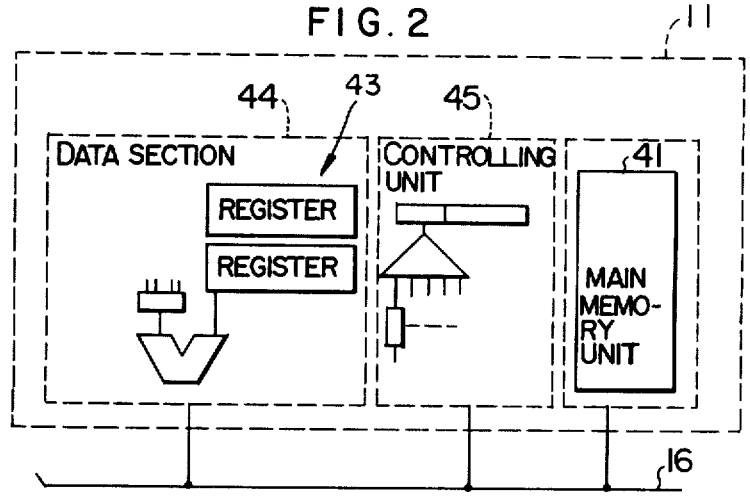
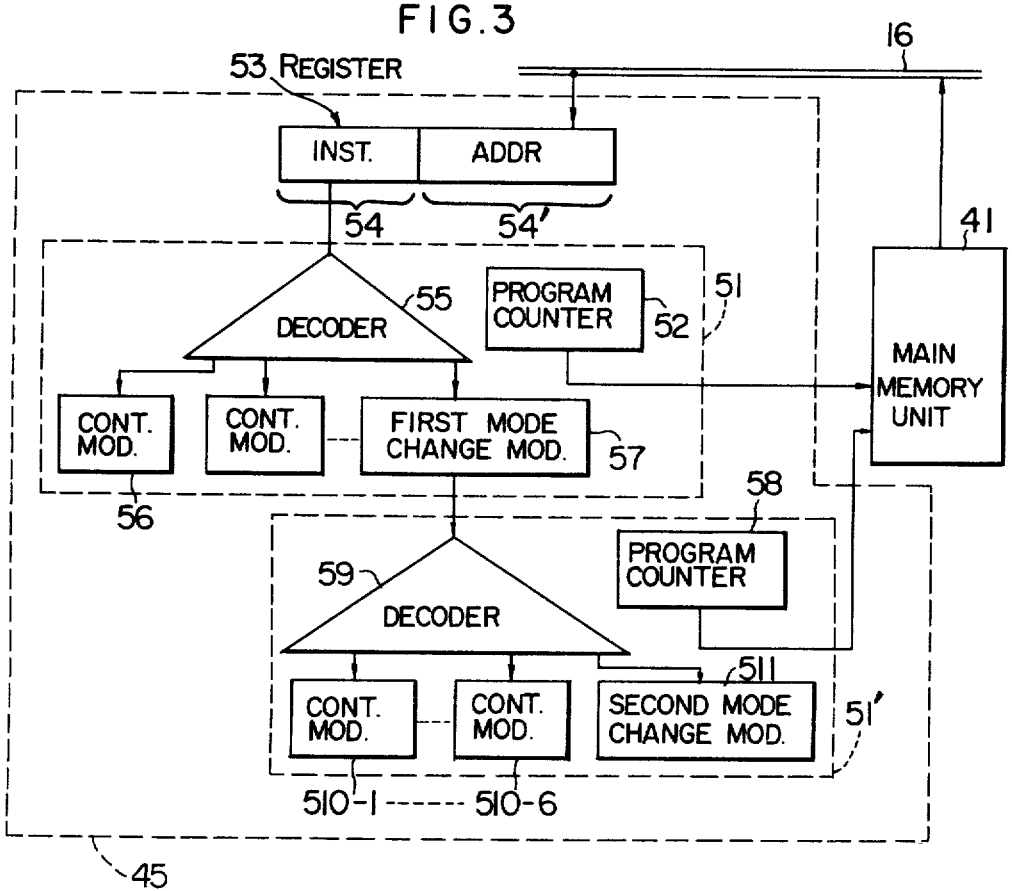

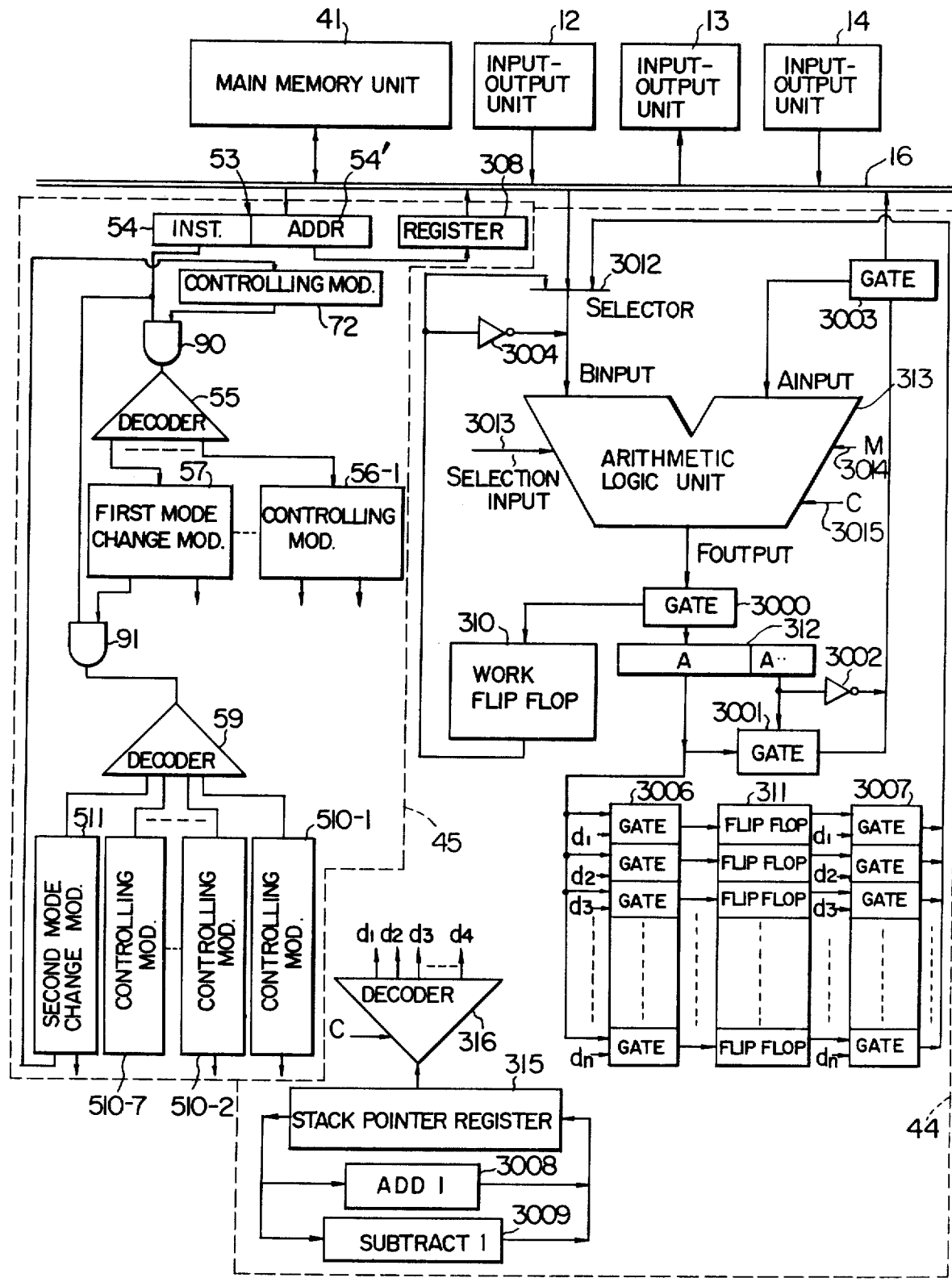

DATA PROCESSOR SYSTEM CAPABLE OF PROVIDING BOTH A COMPUTER MODE AND A SEQUENCER MODE OF OPERATION

CROSS-REFERENCE TO RELATED APPLICATION

This is a continuation-in-part application of the co-pending U.S. application Ser. No. 746,001 filed on Nov. 30, 1976, now abandoned.

BACKGROUND OF THE INVENTION

1. Field of the Invention

The present invention relates to a data processor system mainly used for controlling processes on an on-line basis, and more particularly, it relates to a stored-program type data processor capable of performing the duplex functions of operational processing (for example, scientific computation, edition, computer language compiling, etc.) inherent in standard computers and high response sequence controlling operations inherent in sequencers.

2. Description of the Prior Art

Today, interconnections of relay coils and contacts constitute, on the one hand, the most popular arrangement for performing desired sequence control and, on the other hand, various programmable sequence controllers are being contrived which are widely applicable to objects to be controlled, including processes and apparatuses. Among programmable sequence controllers, those suitable for carrying out complicated and high grade sequence control operations are called stored-program type sequencers. A stored-program type sequencer is provided with an addressed input unit for fetching input signals from an object to be controlled (for example, from limit switches and switches related thereto), an addressed output unit for sending output signals to the object to be controlled (for example, to solenoid valves and motor contactors) and a memory for storing a program edited on the basis of these addresses, and it sequentially reads the stored program out of the memory to produce a sequence controlling output.

The common stored-program type sequencer, as described above, however, is subject to the difficult problem that such a sequencer can only operate to carry out a digital sequence of processing controls concerning on-off signals generated by contacts. In many applications, the process to be controlled includes not only digital sequence control but also coexistent analog signals. Therefore, there is the need for use of an analog input-output units with such a sequencer as well as an analog to digital data processing converter. Conventionally, a sequencer and a computer were alternately used in accordance with a variety of process operations for controlling the process including coexistent analog signals. However, the disadvantages in such use of both a sequencer and a computer for a single process are obvious.

SUMMARY OF THE INVENTION

An object of the present invention is to provide a data processor capable of performing duplex functions by having a computer mode for carrying out analog input-output processing operations, data operation processing and the like, and a sequencer mode for carrying out high response digital sequence control.

According to the present invention, there is provided a data processor system which is capable of operating in a computer mode through the use of a controlling unit which is operated only when the processor is changed to the computer mode for carrying out data processing, and in a sequencer mode through the use of a controlling unit which operated only when the processor is changed to the sequencer mode for carrying out high response sequence control on the basis of programmed sequences, and which includes means for effecting a change between the computer and sequencer modes by executing a mode change instruction.

BRIEF DESCRIPTION OF THE DRAWINGS

FIG. 1 is a schematic block diagram of one embodiment of the invention.

FIG. 2 is an internal block diagram of a processor unit of FIG. 1 which is a principal part of the invention.

FIG. 3 is a block diagram of a controlling unit 45 of FIG. 2.

FIG. 4 is a circuit diagram of one example of a controlling module as shown in FIG. 3 incorporating an ROM (read only memory).

FIG. 6 is a diagram, in the form of a ladder symbol, of one example of the sequence controlling processing executed by the embodiment of FIGS. 1 to 5.

FIG. 7 is a circuit diagram of a data section 44 shown in FIG. 2.

DETAILED DESCRIPTION OF PREFERRED EMBODIMENTS

Figure 5:
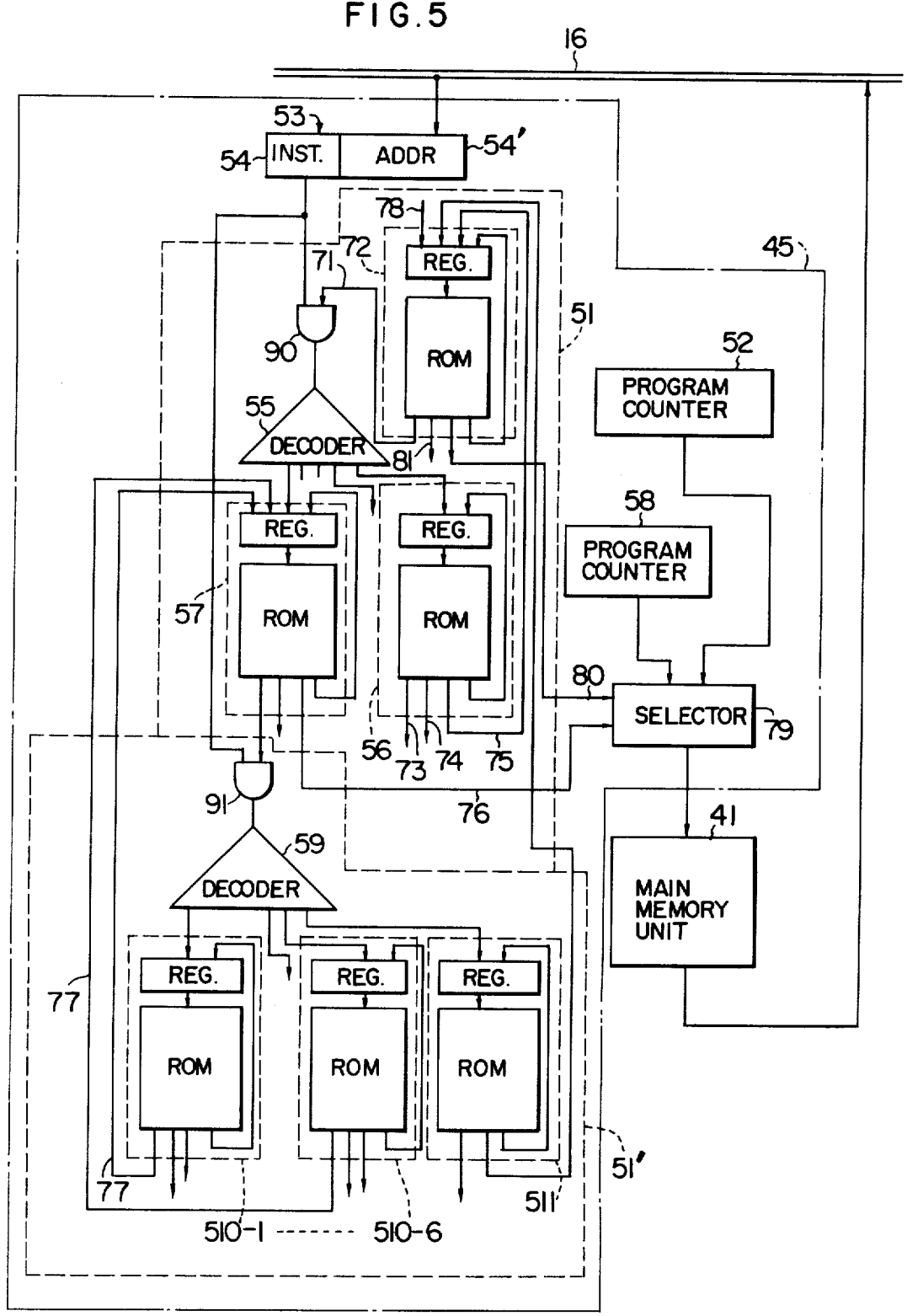
FIG. 5 is a detailed circuit diagram of the controlling unit of FIG. 3.

Referring to FIGS. 1 to 9, a data processor system embodying the present invention will be described.

A data processor system having a data processor according to the present invention, as exemplified in FIG. 1, comprises a processor unit 11 and a plurality of input-output units 12 to 15 connected to an external bus 16. The input-output units 12 to 15 correspond to a digital input unit, a digital output unit, an analog input unit and an analog output unit, respectively.

The processor unit 11 is capable of carrying out two modes of operation, a computer mode of operation and a sequencer mode of operation, and during the sequencer mode of operation, a train of sequence instructions stored in the processor unit 11 is executed successively. To give a general description of the execution of the sequence instruction, it will be appreciated that on-off information by a contact assigned by an instruction is fetched by the digital input unit 12 and a sequence processing on the basis of the train of sequence instructions is carried out in the processor unit 11 to deliver a result of the processing via the digital output unit 13.

During the computer mode of operation, processing not achieved by the above-mentioned sequence instruction is carried out, this processing including analog to digital conversion of analog information fetched by the analog input unit, arithmetic data operation, and the like.

Referring now to FIG. 2, there is illustrated the processor unit 11 including a main memory unit 41 for storing data and instructions, a group of registers 43 for temporarily storing data, a data section 44 for making interconnections between the registers, and a controlling unit 45 for decoding instructions to control the processor unit in accordance with a decoded instruction. The group of register 43 includes an accumulator, a stack register and a stack pointer. As shown in FIG. 3, the controlling unit 45 includes a computer mode controlling section 51 having a program counter 52 and a sequencer mode controlling section 51' having a program counter 58. First, during the computer mode of operation, an instruction which is designated by the program counter (hereinafter referred to as PC) 52 is read out from the main memory unit 41 and is set in an instruction register 53 by transmission through a bus 16. An instruction code part 54 representative of the instruction is decoded by a computer mode decoder 55. When the instruction code part is decoded, a controlling module 56 corresponding to the instruction is selected and started to transmit a control timing pulse. Since the control timing pulse is supplied to each component of the processor, the selected controlling module can execute a control initiated by the instruction. If a result of decoding implies a mode change instruction to the sequencer mode, i.e., a START instruction, a controlling module 57 starts to operate to send a control pulse for stopping the delivery of output from the computer mode PC 52, then causing a sequencer mode PC 58 to deliver an output. Thereafter, the command read out from the main memory unit 41 is set in the register 53 which causes a sequencer mode decoder 59 to decode the instruction code 54. The decoded sequencer instruction selects a corresponding controlling module 510, thereby completing the changing of the mode. The selected controlling module then sends a controlling pulse initiated by the instruction and executes the instruction. If the instruction implies change to the computer mode or a SEND instruction, the decoder 59 selects a SEND controlling module 511. Then, the SEND controlling module 511 stops the delivery of an output from the sequencer mode PC 58, starting the computer mode PC 52. Next, the instruction code part 54 representative of the instruction read out by the register 53 via the main memory unit 41 is decoded by the decoder 55 to drive the controlling module 56 and the other controlling modules. Through the above procedure, the change between the computer and sequencer modes is effected. It will be appreciated that the controlling modules 56, 57, 510 and 511 may respectively be constituted by a control timing pulse circuit in the form of a wired logic circuit or by a control timing pulse circuit operated in accordance with a predetermined logic by sequentially executing a program fixed into a read only memory (ROM).

The respective controlling modules 56 constitute a control timing pulse circuit corresponding to the decoded instruction code, each module producing a different timing pulse in accordance with the instruction code. FIG. 4 shows a principal part of a controlling module circuit which is partially assisted by a microprogram fixed into a ROM. A controlling pattern (sequence of generation of the timing pulse) has been fixed into a ROM 62. A register 63 indicates an address for the ROM 62. An address representative of a pattern to be read out next is sent via a signal line 64 to the register 63. Signal line 65 is connected to select a main module. An output timing pulse of the ROM 62 is a control signal for controlling the data processor and sent via controlling signal lines 67 and 68. Each controlling module operates as detailed hereunder with reference to FIG. 5.

When a source of power to the processor unit 11 is turned on, signals 78 are supplied to a controlling module 72 and the controlling module 72 starts to operate, bringing the processor unit 11 into the computer mode.

The controlling module 72 is a pulse generator circuit which generates a control timing pulse for fetching the instruction from the main memory unit during the computer mode. The controlling module 72 sends a signal 80 to a selector 79 which in turn is switched over by the signal 80 to select the program counter 52. Next, an instruction reading-out signal 81 is supplied from the controlling module 72 to the main memory unit 41 and the instruction is read out. Since the program counter 52 is for the computer mode, the instruction read out is 52 for the computer mode. This instruction is set into the instruction register 53. The instruction word consists of two parts, the instruction code part 54 and an address part 54'. If the instruction code part 54 consists of 3 bits, a variety of 8 instructions, at the most, can be obtained. If the address part 54' consists of 5 bits, it is possible to designate 32 addresses. The controlling module 72 also sends an instruction decoding command signal 71 to open a gate 90 so that the instruction code part 54 is decoded at the decoder 55. This decoder 55 selects a controlling module corresponding to a computer instruction word of the instruction code part 54. If the controlling module 56 is selected, it sends out, in accordance with its ROM pattern, signals 73 and 74 for controlling each component of the data processor. These timing pulses are generated in an orderly manner in order to accomplish processing which the instruction code part implies. When such a processing is completed, a signal 75 then drives the controlling module 72 and stops the controlling module 56. In this manner, the execution of one computer instruction has been terminated. Subsequently, the next computer instruction is fetched from the main memory unit and decoded. If the decoded instruction implies a mode change from the computer mode to the sequencer mode, i.e., the START instruction, the mode change controlling module 57 is selected. The controlling module 57 is started, delivering a signal on the line 76. When receiving this signal, the selector 79 selects an output from the sequencer program counter 58 in place of that from the computer program counter 52. A sequence instruction within the main memory unit 41 assigned by the sequencer PC (program counter) 58 is set into the register 53. The controlling module 57 opens a selecting gate 91 and leads the instruction code 54 of this command to the sequencer decoder 59. Thus, the operation mode has been changed to the sequencer mode. The decoder 59 selects one of controlling modules 510-1 to 510-7 and 511 in response to the sequencer instruction. The one selected controlling module delivers, upon completion of its processing, a signal on line 77 which reactuates the controlling module 57. The reactuated controlling module 57 leads a subsequent fresh sequencer instruction to the decoder 59, selects one controlling module corresponding to the subsequent instruction and finally stops. If the instruction implies a SEND instruction (a mode change instruction from sequencer to computer mode), the module 511 is selected. When actuated, the module 511 causes the controlling module 72 to start, rendering itself inactive. Thus, the operation mode has been changed to the computer mode. The controlling module 72 decodes a computer instruction to cause a corresponding computer instruction controlling module to start. Only when the module 57 is in operation the sequencer program counter 58 is selected.

Now, a description will be given of the respective controlling modules 510-1 to 510-7 and 511 operable in response to each sequencer instruction. In this example, the sequencer instruction is classified into eight types as listed in Table 1.

TABLE 1

| | Instruction | Contents of processing |
|---|---|---|
| 1 | SAND | (A..) Λ (PA) ⟶ A.. |
| 2 | OUT | (A..) ⟶ PA |
| 3 | SQBS | 1 ⟶ A.., 0 ⟶ WK |
| 4 | BRS | (A..) ⟶ STACK, (STACKPTR) + 1 ⟶ STACKPTR |
| 5 | BRR | (A..) V (WK) ⟶ WK, (STACK) ⟶ A.. |
| 6 | BRE | (A..) V (WK) ⟶ A.., (STACKPTR) − 1 ⟶ STACKPTR, 0 ⟶ WK |
| 7 | NAND | A..Λ($\overline{PA}$) ⟶ A.. |
| 8 | SEND | mode change from sequencer to computer mode |

Symbol A.. in Table 1 represents one bit of the least significant digit of the accumulator A. Symbol WK represents a one bit flip-flop. Symbol STACK represents a stack register composed of a plurality of one bit flip-flops. Symbol STACKPTR represents a stack pointer register designating the address of the STACK. Symbol PA represents the address of an external input-output unit which is designated by the address part of the instruction word.

The sequencer mode controlling modules 510-1 to 510-7 and 511 as shown in FIG. 5 execute instruction 1 to 8 in Table 1, respectively.

Turning now to FIG. 6, a sequence operation will be described by way of an example of a sequence illustrated in terms of a ladder symbol. In the figure, the symbol typically designated at 201 represents a normally-closed contact of a relay, 207 an output coil, 21 and 23 branches, and 22 and 24 junctures of signal lines. The output coil for controlling the external conditions and the contact for detecting the external conditions are given by the digital output unit 13 and the digital input unit 12, respectively, via the input-output bus 16. A program for executing the sequence of FIG. 6 on the basis of the instructions of Table 1 is listed in Table 2.

TABLE 2

| No. | Instruction | Input-output point | Contents |
|---|---|---|---|
| 1 | SQBS | | Beginning of sequence block |
| 2 | BRS | | Presence of branch 23 |
| 3 | BRS | | Presence of branch 21 |
| 4 | SAND | 201 | Presence of normally-closed contact 201 |
| 5 | NAND | 202 | Presence of normally-opened contact 202 |
| 6 | BRR | | Returning to branch 21 |
| 7 | SAND | 203 | Presence of normally-closed contact 203 |
| 8 | BRR | | Returning to branch 21 |
| 9 | SAND | 204 | Presence of normally-closed contact 204 |
| 10 | BRE | | Connection of branches at juncture 22 |
| 11 | SAND | 205 | Presence of normally-closed contact 205 |
| 12 | BRR | | Returning to branch 23 |
| 13 | SAND | 206 | Presence of normally-closed contact 206 |
| 14 | BRE | | Connection of branches at juncture 24 |
| 15 | OUT | 207 | Delivery of output to relay coil 207 |

Turning to FIG. 7, the flow of data will be explained when the respective sequencer mode controlling modules are brought into operation. The controlling unit 45 and data section 44 of FIG. 2 are detailed in FIG. 7. Reference numerals 53, 54, 56, 57, 59, 90, 91 and 510-1 to 510-7 and 511 in the controlling unit 45 designate the same components as those described with reference to FIG. 3, and reference numeral 308 designates an address register. The data section 44 includes a work flip-flop 310, a stack register 311, an accumulator 312, an arithmetic logic unit 313, a stack pointer register 315, a decoder 316, gates 3000, 3001, 3003, 3006 and 3007, inverters 3002 and 3004, an adder-1 3008, a subtractor-1 3009, and a selector 3012.

Reference numeral 3013 designates a selection input to the arithmetic logic unit 313, 3014 an M signal, and 3015 a C signal. As the arithmetic logic unit 313, commercially available TYPE SN54181 or SN74181 manufactured by Texas Instrument Incorporated may be used. The arithmetic logic unit is shown in an equivalent circuit of FIG. 8 and its function table is listed in Table 3.

TABLE 3

| Selection | | | | | M = L | | M = L |
|---|---|---|---|---|---|---|---|
| S3 | S2 | S3 | S1 | M = H | C = H | C = H | |
| L | L | L | L | F = $\overline{A}$ | F = A | | F = A PLUS 1 |
| L | L | L | H | F = $\overline{AVB}$ | F = AVB | | F = (AVB) PLUS 1 |

TABLE 3-continued

| Selection | | | | M = H | M = L | |
|---|---|---|---|---|---|---|
| S3 | S2 | S3 | S1 | | C = H | C = H |
| L | L | H | L | F = $\overline{A \wedge B}$ | F = A V $\overline{B}$ | F = (A + $\overline{B}$) PLUS 1 |
| L | L | H | H | F = ZERO | F = MINUS 1 | F = ZERO |
| L | H | L | L | F = $\overline{A \wedge B}$ | F = A PLUS (A $\wedge \overline{B}$) | F = A PLUS (A $\wedge \overline{B}$) PLUS 1 |
| L | H | L | H | F = $\overline{B}$ | F = (AVB) PLUS (A $\wedge \overline{B}$) | F = (AVB) PLUS A $\wedge \overline{B}$ PLUS 1 |
| L | H | H | L | F = A ⊕ B | F = A MINUS B MINUS 1 | F = A MINUS B |
| L | H | H | H | F = A $\wedge \overline{B}$ | F = (A $\wedge \overline{B}$) MINUS 1 | F = A $\wedge \overline{B}$ |
| H | L | L | L | F = $\overline{A}$VB | F = A PLUS (A $\wedge$ B) | F = A PLUS (A $\wedge$ B) PLUS 1 |
| H | L | L | H | F = $\overline{A \oplus B}$ | F = (AV$\overline{B}$) PLUS (A $\wedge$ B) | F = A PLUS B PLUS 1 |
| H | L | H | L | F = B | F = A PLUS B | F = (AV$\overline{B}$) PLUS (A $\wedge$ B) PLUS 1 |
| H | L | H | H | F = A $\wedge$ B | F = (A $\wedge$ B) MINUS 1 | F = A $\wedge$ B |
| H | H | L | L | F = 1 | F = A PLUS A | F = A PLUS A PLUS 1 |
| H | H | L | H | F = AV$\overline{B}$ | F = (AVB) PLUS A | F = (AVB) PLUS A PLUS 1 |
| H | H | H | L | F = AVB | F = (AV$\overline{B}$) PLUS A | F = (AV$\overline{B}$) PLUS A PLUS 1 |
| H | H | H | H | F = A | F = A MINUS 1 | F = A |

Note:
(i) . means each bit shifted to the next more significant position.
(ii) ⊕ means "exclusive or"

As will be seen from Table 3, the function of the arithmetic logic unit embodied herein is designated by the four-bit selection input, M signal and C signal.

(a) SAND instruction

A SAND instruction read out of the main memory unit 41 is sent to the instruction register 53 and set therein. The instruction code part 54 of the SAND instruction is sent to the decoder 59 to be decoded therein, while sending a command signal to the SAND instruction controlling module 510-1. The address part of the instruction register designates an input point address of the digital input unit 12. The address thus designated is called a point address PA. The address part of the implies a point address PA obtained via the main memory unit 41. This point address PA part of the instruction word is sent to the register 308 on the basis of the control timing pulse sent from the instruction controlling module 510-1. The on-off state of the digital input is read out of a digital input point assigned an address corresponding to that point address via the register 308 and put on the input-output bus 16. On the other hand, the instruction controlling module 510-1 controls the gates 3001 and 3003 thereby to send the content of the least significant bit A.. of the accumulator 312 to an A input of the arithmetic logic unit (ALU) 313. The ALU 313 produces, from the content of the least significant bit A.. of the accumulator 312 sent via the gates 3001 and 3003 and the data read out of the input point on the basis of the abovementioned point address, a logic "and" which in turn is stored in the least significant bit A.. of the accumulator 312 via the gate 3000 enabled under the control of the SAND instruction controlling module 510-1. Thus, the SAND command operation has been completed. It is to be noted that the on-off state of the point address PA is coupled with the B input of the ALU 313 via a selector 3012. A control code of "HLHH" is sent to the selector 3012 from the instruction controlling module 510-1 so that an output F of the ALU becomes (A input) A (B input) (See FIG. 8).

(b) OUT instruction

An instruction code part 54 of an OUT instruction stored in the instruction register 53 is decoded in the decoder 59 thereby to produce a command signal which in turn is sent to the OUT instruction controlling module 510-2. The OUT instruction controlling module 510-2 controls the gates 3001 and 3003 thereby to put the content of the least significant bit A.. of the accumulator 312 on the input-output bus 16. Thereafter, a point address of the address section ADDR is sent to the address register 308 so that the data read out of the accumulator 312 and presently put on the input-output bus 16 are delivered to a digital output point 13 assigned an address corresponding to that point address via the address register 308. Thus, the OUT command operation has been completed.

(c) SQBS command

An instruction code part 54 of an SQBS instruction stored in the instruction register 53 is decoded in the decoder 59 thereby to produce a command signal which in turn is sent to the SQBS instruction controlling module 510-3. The SQBS instruction controlling module 510-3 sends a control code of "HHLL" to the selector input of the ALU and renders the M signal "H", thereby making the ALU produce "1" from its all bits. This data "1" is written into the accumulator 312 by controlling the gate 3000. Thereafter, the SQBS instruction controlling 510-3 causes the stack pointer register 315 to be set to "0". This "0" setting in the register 315 can be accomplished by resetting the register 315. Obviously, a memory register indicating "0" (a power supply is available for this purpose) may be provided for setting "0" to the register 315. Thereafter, a control code of "LLHH" is supplied to the selection input of the ALU from the module 510-3 to render the M signal "H". Thus, "0" is delivered out of the ALU and sets the work flip-flop 310 to "0" via the gate 3000.

(d) BRS instruction

An instruction part 54 of a BRS instruction read out of the instruction register 53 is decoded in the decoder 59 thereby to selectively drive the BRS instruction controlling module 510-4. The BRS instruction controlling module 150-4 first causes the content of the register 315 to be sent to the decoder 316 and to be decoded therein. This decoding is accomplished in such a manner that the gate of the decoder 316 is opened by a command signal C sent from the BRS instruction controlling module 510-4, thereby producing intended a command signal di, where i represents any one of integers 1 to n determinable by the result of decoding. The command signal di produced by the decoder 316 is sent to the gates 3006 and 3007. The BRS instruction controlling module 510-4 sends a gate enabling signal to only the gate 3006 of those gates 3006 and 3007 so that a gate associated with the i-th one of the stack flip-flop 311 is enabled under the command of the command signal di, thereby the content of the least significant bit of the accumulator 312 is stored in the i-th bit position via the gate 3001. In this manner, the content of the least significant bit of the accumulator 312 is stored in an intended bit position of any one of the stack flip-flop 311 in accordance with the content assigned by the stack pointer register 315. Next, the BRS instruction controlling module 510-4 renews the value of the stack pointer register by one. This renewal is accomplished by sending the content of the register 315 to the Add 1 circuit 3008 to add "1" and again sending a result of the addition to the register 315. Through the above operation, the BRS instruction processing has been completed.

(e) BRR instruction

A BBR instruction read out of the main memory unit is stored in the register 53 and its instruction code part 54 is sent to the decoder 59. As a result of decoding in this decoder 59, the BRR instruction controlling module 510-5 is selectively driven. The BRR instruction controlling module 510-5 first reads out the content of the work flip-flop 310 which in turn is sent to the B input of the ALU 313 via an inverter 3004. On the other hand, the BRR instruction controlling module 510-5 drives the inverter 3002 to deliver the content of the least significant bit of the accumulator 312 to the A input of the ALU 313. Next, a control code of "LHLL" is applied to the selection input 3013 of the ALU 313 to thereby render the M signal "H". Accordingly, in accordance with de Morgan's theorem, $\overline{A \wedge B} = A \vee B$, the ALU 313 produces a logic "or". An output of the ALU 313 is sent to the accumulator 312 via the gate 3000 which is enabled by the BRR instruction controlling module 510-5 and set in the accumulator.

The BRR instruction controlling module 510-5 then receives the command signal di which is the output of the decoder 316 delivered in accordance with the address of the stack pointer register 315 i.e., the content of the register 315. Along with this command signal di, the BRR instruction controlling module 510-5 sends a gate enabling signal to the gate 3007. In consequence, the content of the stack register 311 which is in the i-th bit position (address) commanded by the stack pointer register 315 is read out by way of the gate 3007. This read-out content is applied to the B input of the ALU 313 via the selector 3012. Since the ALU 313 is applied with a selection input of "HLHL", together with the M signal of "H", the read-out content is directly stored in the accumulator 312 via the ALU. Thus, the BRR instruction processing has been completed.

(f) BRE instruction

A BRE instruction read out of the main memory unit is stored in the register 53 and its instruction code part 54 is sent to the decoder 59 to be decoded therein. As a result of decoding, the BRE instruction controlling module 510-6 is selectively driven. The BRE instruction controlling module 510-6 causes the content of the work flip-flop 310 to be applied to the B input of the ALU 313 via the inverter 3004, while causing the content of the least significant bit A.. of the accumulator 312 to be applied to the A input of the ALU 313 via the inverter 3002 and then gate 3003. Also, the BRE instruction controlling module 510-6 applies a control code of "LHLL" to be selection input 3013 of the ALU 313, together with the M signal of "H". Then, in accordance with the Morgan's theorem, $\overline{A \wedge B} = A \vee B$, a logic "or" of the contents of A.. and work flip-flop 310 is obtained. The "or" output of the ALU 313 is sent via the gate 3000 to the accumulator 312 and set therein. Thus, the content of the least significant bit A.. is stored with the logic "or" of the previous content of A.. and the content of the work flip-flop 310. Thereafter, the stack pointer register 315 is read out, and its content is subtracted by one at the Subtract 1 circuit and again stored in the stack pointer register 315. Finally, the BRE instruction controlling module 510-6 applies a control code of "LLHH" to the selection input 3013 of the ALU 313. At this time, "0" is delivered out of the ALU and stored in the work flip-flop via the gate 3000, thus completing the BRE instruction processing.

(g) NAND instruction

A NAND instruction read out of the main memory unit is set in the register 53 and its instruction code part 54 is sent to the decoder 59 to be decoded therein. As a result of decoding, a NAND instruction controlling module 510-7 is selected. An address part of the instruction code is set in the register 308, indicating an input point of the digital input unit 12. This address is called point address PA. The part of this point address PA of the instruction is set in the register 308 under the command of a control timing pulse from the instruction module 510-7. The on-off state of digital input representative of the point address designated by the register 308 is read out and put on the input-output bus 16. On the other hand, the instruction controlling module 510-7 controls the gates 3001 and 3003 to send the content of the least significant bit A.. to the A input of the ALU. The on-off signal representative of the input point address put on the input-output bus 16 is led to the B input of the ALU 313 via the selector 3012. At this time, the instruction controlling module 510-7 applies a control code of "LHHH" to the selection input 3013 of the ALU 313 and the M signal is at "H". Then, the ALU 313 produces a logic output defined by AAB̄. Namely, the output of the ALU is a logic "and" of the invention of the on-off state representing the input point and the previous content of the accumulator 312. The logic "and" from the ALU 312 is set in the accumulator, completing this instruction processing.

(h) SEND instruction

A SEND instruction read out of the main memory 41 is set in the instruction register 53 and an instruction code part 54 is decoded by the decoder 59, the output therefrom designating a SEND instruction controlling module 511. A control timing pulse from the SEND instruction controlling module 511 stops the sequence mode program counter 58 as shown in FIG. 5. Subsequently, the control signal 76 switches over the selector 79 so as to couple the output of the computer program counter 52 with the main memory unit 41. Finally, the program counter 52 is driven so that the mode change from the sequencer mode to the computer mode has been effected in the data processor, thus completing this instruction processing.

By combining the sequencer mode instruction words for operations set forth above, the sequence control can be carried out. One example of sequence control programming has already been listed in Table 2. The sequence control logic on which Table 2 is based has also been illustrated in FIG. 6.

The following Tables 4 and 5 show examples of computer mode instruction.

TABLE 4

| | The Computer Mode Instruction Label | Instruction Set Operation |
|---|---|---|
| 1 | LD | (Memory) → A |
| 2 | ST | (A) → (Memory) |
| 3 | A | (A) + (Memory) → A |
| 4 | S | (A) − (Memory) → A |
| 5 | COMP | If (A) < (Memory) then 1 → A. In other cases, "0" → A. |
| 6 | OUTPUT | (A) → Digital Output |
| 7 | INPUT | (Analog Input) → A |
| 8 | START | Change mode to sequencer |

TABLE 5

Figure 8:
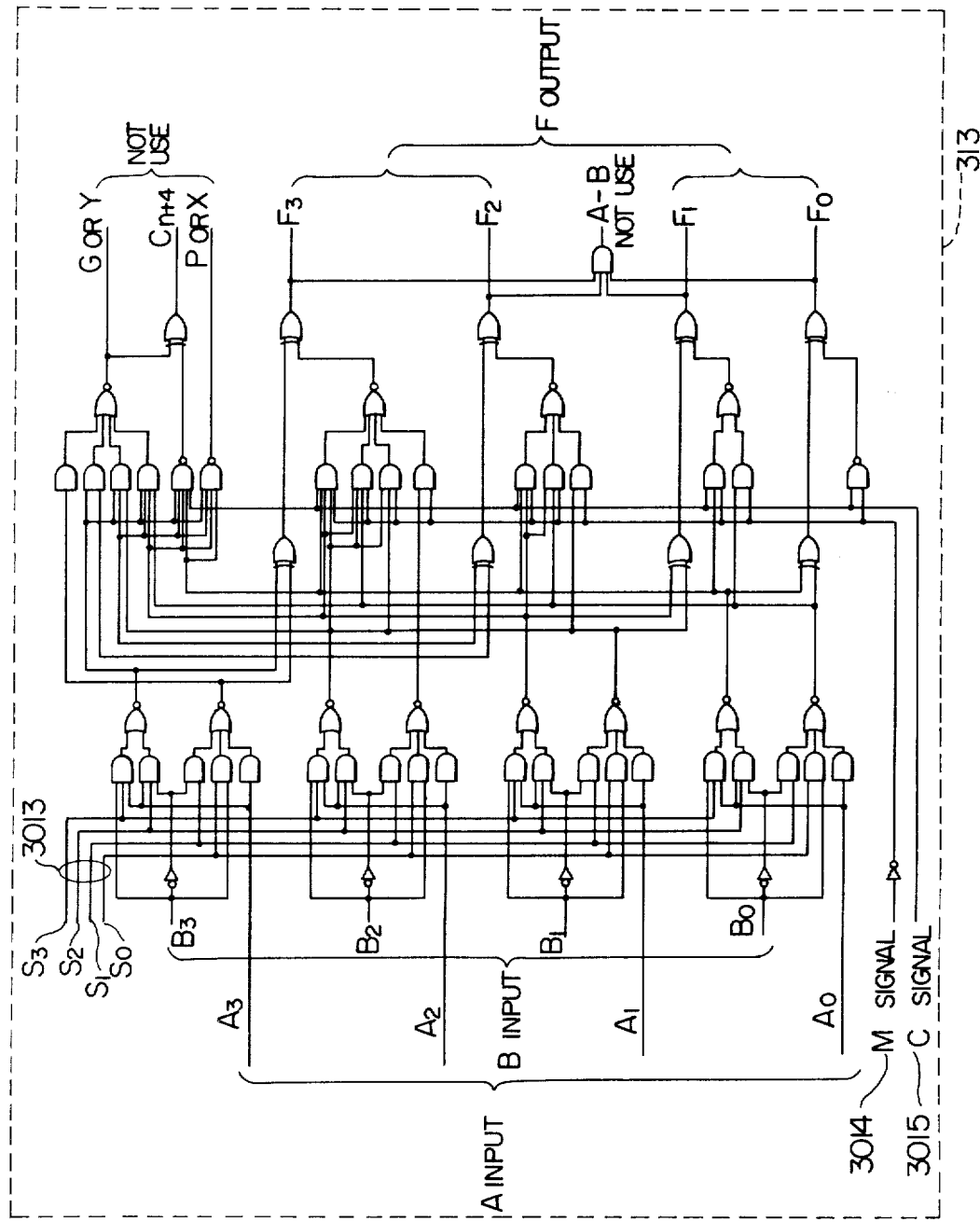
FIG. 8 is a circuit diagram of an arithmetic logic unit 313 shown in FIG. 7.
Figure 9:
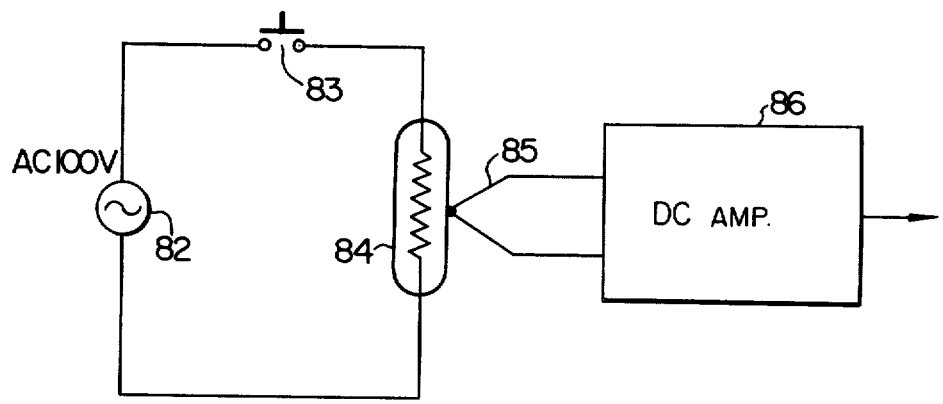
FIG. 9 is a circuit diagram, partly in block form, showing one example of the process controlling executed by the embodiment as shown in FIGS. 1 to 8 when it operates in the computer mode.

| An Example of Program for Controlling FIG. 8 System with FIG. 9 Flow Chart | | |
|---|---|---|
| Memory Address | Instruction | Explanation of Program |
| 1 | INPUT | Receive an analog input representative of temperature of an electric furnace |
| 2 | COMP | Compare a temperature of 300° C. stored in the memory with a measured temperature of the accumulator. |
| 3 | OUTPUT | Deliver a control signal on the digital output to turn on-off the control power switch. |

FIG. 9 shows a simple electric furnace. A power source of AC 100 V 82 is connected to a heater 84 via a control switch 83. The temperature of the electric furnace is measured by a thermocouple 85 and amplified at a DC amplifier 86.

Figure 10:
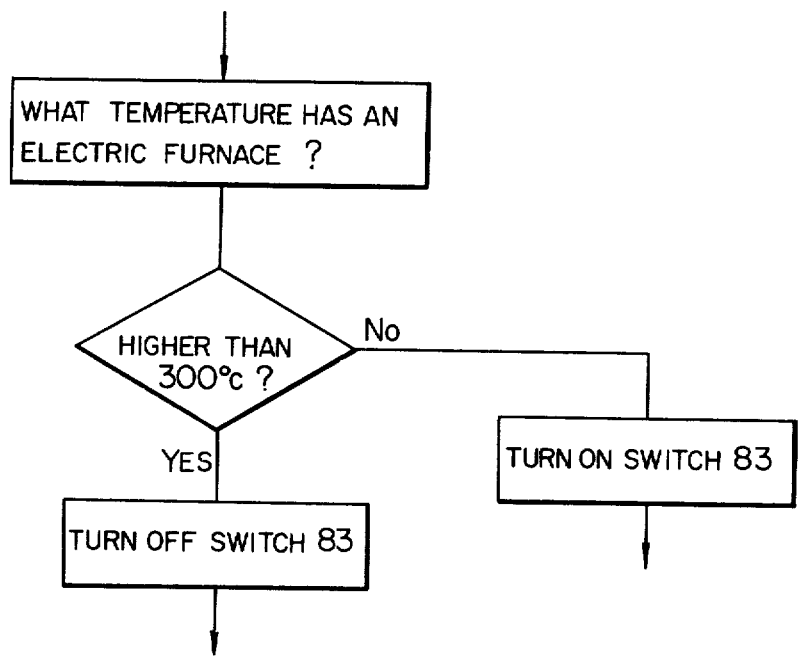
FIG. 10 is a flow chart in accordance with the process controlling of FIG. 9.

This electric furnace is controlled in accordance with a flow chart as shown in FIG. 10. Such a control has conventionally been carried out with a computer and could not be done with a sequencer. The computer mode instructions as listed in Table 3 is applicable to this embodiment, and Table 5 shows one example to program FIG. 10 flow chart using instructions in Table 4.

In this manner, the data processor with the computer mode according to this invention can easily achieve the electric furnace control by using as a reference the target value of temperature data stored in the main memory. Complicated controllings other than the electric furnace control may be achieved by combining and programming the instructions in Table 4.

Referring now to FIGS. 7 and 8, computer mode instructions used in this embodiment will be described.

(a) LD instruction

An LD instruction read out of an instruction storing section 41-1 of the main memory unit 41 is set in the registers 53 and its instruction code part 54 is decoded by the computer mode instruction decoder 55, the output therefrom driving the LD instruction controlling module 56-1. An address part 54' of the LD instruction is set in the register 308. This address data designates an address in the main memory of a data to be loaded by the LD instruction. The instruction controlling module 56-1 thus driven generates a control timing signal, and a data as set in the register 308 is read out of the data storing section of the main memory unit 41 and put on the input-output bus 16. Subsequently, the instruction controlling module leads the data on the input-output bus 16 to the B input of the ALU 313 by way of the selector 3012. Thereafter, the M signal to the ALU 313 is rendered "H" and a control signal of "HLHL" is sent as the selection input 3013. Receiving the control signal, the ALU directly delivers out the B input and sends it to the accumulator 312. The data set in the accumulator, completing this instruction.

(b) ST instruction

An ST instruction read out of the instruction storing section of the main memory unit 41 is set in the register 53 and its instruction code part 54 is decoded by the computer mode instruction decoder 55, the decoded output therefrom driving an ST instruction controlling module 56-2. An address part 54' of the ST instruction is set in the register 308 and designates an intended address in the main memory which is stored in the main memory in accordance with the ST instruction. The instruction controlling module 56-2 thus driven generates a control timing signal to control the gate 3003, whereby the content of the accumulator is put on the input-output bus 16. The controlling module subsequently generates a signal for storing the data on the input-output bus in the main memory unit 41. Thus, the ST instruction processing has been completed.

(c) A instruction

An A instruction controlling module 56-3 is driven in a similar way to the above. A data in the data storing section of the main memory unit is led to the B input of the ALU 313 via the input-output bus 16 and then the selector 3012. On the other hand, the content of the accumulator 312 is led to the A input of the ALU 313 via the gate 3003. At this time, the controlling module sends a signal of "HLLH" as the selection input 3013. The M signal is at "L" and C signal is at "H". As a result, the ALU 313 adds data of the A input and B input. The output of ALU 313 resulting from the addition is set in the accumulator, thus completing this instruction processing.

(d) S instruction

In a similar way to the above, a signal of "LHHL" is applied as the selection input. The M signal is at "L" and C signal is at "L". At this time, the A input is subtracted from the B input. The resulting output of the ALU is set in the accumulator, completing this instruction processing.

(e) COMP instruction

In a similar manner to the S instruction, a result of subtraction of the content of the main memory unit from the content of the accumulator is delivered to the ALU 313. In the case of the result being negative, the most significant bit of the accumulator is "1". Conversely, with the result being positive, the most significant bit of the accumulator is "0".

For the most significant bit of "1", a controlling module 56-5 delivers out a signal of "HHLL" as the selection input to the ALU 313, together with the M signal of "H" so that all the bits of the ALU output may be rendered "1" and again set in the accumulator. For the most significant bit of "0", the controlling module 56-5 delivers out a signal of "LLHH" as the selection input to zhe ALU 313 so that all the bits of the ALU output may be rendered "0" and again set in the accumulator. Thus, the COMP instruction processing has been completed.

(f) OUTPUT instruction

In a similar way to the above, the least significant bit A.. of the accumulator 312 is delivered out to the digital output via the gates 3001 and 3003. Accordingly, an external solenoid or power switch connected to the digital output is on-off controlled in accordance with "1" or "0" of the accumulator.

(g) INPUT instruction

In a similar way to the above, an INPUT instruction controlling module 56-7 is selected. An address part 54' of the instruction is set in the register 308 to thereby designate an input point of the analog input unit. The analog input unit 14 coupled with an external analog data converts it into a digital form and puts it on the input-output bus 16. This digital data is applied to the B input of the ALU 313 via the selector 3012. The controlling module 56-7 sends a signal of "HLHL" as the selection input 3013, together with the M signal of "H", and the B input is directly delivered out of the ALU and set in the accumulator 312. In this manner, the data of the analog input is applied to the accumulator 312.

(h) START instruction

In a similar way to the above, a START instruction controlling module 57 is selected. The START instruction controlling module stops the computer mode program counter 52 as shown in FIG. 5 and a signal 80 switches over the selector 79 so that the output of the program counter 58 is connected to the main memory unit 41. Subsequently, the program counter 58 is driven, thus completing this instruction processing. Namely, the mode change from the computer mode to the sequencer mode has been effected.

We claim:

1. A data processor system capable of providing both a computer mode and a sequencer mode of operation comprising;

a processor unit including a main memory unit for storing data, a train of computer mode instructions and a train of sequencer mode instructions, including mode change instructions; a controlling unit for sequentially reading out the instructions in said main memory unit and for outputting a series of controlling signals for use in executing said instructions; and a data section responsive to said controlling signals from said controlling unit for performing computer mode and sequencer mode operations; and a plurality of input-output units connected with said processor unit for sending and receiving data between an external apparatus and said processor unit;

said controlling unit including;

an instruction register composed of an instruction code part and an address part for retaining an instruction having an instruction code portion and an address portion read out from said main memory;

a first controlling section operated only in response to computer mode instructions and including, a first instruction decoder connected to said instruction code part of said instruction register through a first selecting gate opened when said computer mode instructions are to be executed, for generating a selecting signal in response to the instruction code portion of said computer mode instruction retained by said instruction register; a plurality of instruction control modules each of which generates controlling signals for use in executing a computer mode instruction when selected by said selecting signal of said first instruction decoder; and a first mode change module responsive to the selecting signal of said first instruction decoder for generating a signal for opening a second selecting gate connected to the instruction code part of said instruction register in response to a first mode change instruction in said instruction register instructing that the mode of operation of the system is to be changed from the computer mode to the sequencer mode;

a second controlling section operated only in response to a sequencer mode instruction, including a second instruction decoder connected to said instruction code part of said instruction register through said second selecting gate which is opened when said sequencer mode instructions are to be executed, for generating a selecting signal in response to the instruction code portion of said sequencer mode instruction retained by said instruction register; a plurality of instruction control modules each of which generates controlling signals for use in executing a sequencer mode instruction when selected by said selecting signal of said second instruction decoder; and a second mode change module responsive to the selecting signal of said second instruction decoder for generating a signal for opening said first selecting gate in response to a second mode change instruction in said instruction register instructing that the mode of operation of the system is to be changed from the sequencer mode to the computer mode; and said data section including arithmetic logic means responsive to the controlling signals from said controlling unit and data from said input-output units for controlling an input-output unit designated by the address portion of an instruction word.

2. A data processor system according to claim 1, wherein said controlling unit comprises a first program counter for successively assigning addresses within said main memory unit corresponding to the computer mode instructions to be executed, a second program counter for successively assigning addresses within said main memory unit corresponding to the sequencer mode instructions to be executed, and a selector for selecting one of said first and second program counters for assigning instructions to be executed, in response to the output from the first and/or second mode change module.

3. A data processor system according to claim 1, wherein said controlling unit includes means for generating a signal to open the first selecting gate at the beginning of operation of the system.

4. A data processor system capable of providing both a computer mode and a sequencer mode of operation comprising a processor unit including a main memory unit for storing data, sequencer mode commands and computer mode commands, a controlling unit for reading out the commands in said main memory unit and for outputting a series of signals for executing said commands, and a data section responsive to said signals from said controlling unit for performing computer mode and sequencer mode operations; and a plurality of input-output units connected with said processor unit for sending and receiving data between an external apparatus and said processor unit;

said controlling unit including a register for storing a command received from said main memory unit; a first controlling section operated only in response to computer mode commands for controlling said data section to perform computer mode operations including a first program counter for successively assigning addresses in said main memory unit corresponding to the computer mode commands to be executed, a plurality of first control modules and first decoder means responsive to a command stored in said register for enabling one of said first control modules to control said data section to perform computer mode operations; and a second controlling section operated only in response to sequencer mode commands for controlling said data section to perform sequencer mode operations, including a second program counter for successively assigning addresses in said main memory unit corresponding to the sequencer mode commands to be executed, a plurality of stored control modules and second decoder means responsive to a command stored in said register for enabling one of said second control modules to control said data section to perform sequencer mode operations; said computer mode commands and said sequencer mode commands each including a mode change command; and selector means connected to a designated first control module and a designated second control module which are enabled in response to a mode change command for effecting a switching between said first and second controlling sections of said controlling unit for reading out sequencer mode commands or computer mode commands from said main memory unit so as to effect a change in the operation of said data section between the computer mode and the sequencer mode of operation.

5. A data processor system as defined in claim 4 wherein said first decoder means is connected to said register and to said designated one of said first control modules and is responsive to a mode change command for applying the contents of said register to said second decoder means and for actuating said selector means to enable said second program counter to apply addresses to said main memory unit.

6. A data processor system as defined in claim 5 wherein said designated one of said second control modules is responsive to a mode change command for actuating said selector means to enable said first program counter to apply addresses to said main memory unit.

* * * * *